United States Patent

Spradlin et al.

[11] Patent Number: 5,570,613
[45] Date of Patent: Nov. 5, 1996

[54] ACCELERATOR PEDAL MECHANICAL GOVERNOR

[76] Inventors: Gregory A. Spradlin; Gloria I. Spradlin, both of 8401 Milwaukee St., Ft. Lewis, Wash. 98433

[21] Appl. No.: 351,683

[22] Filed: Dec. 8, 1994

[51] Int. Cl.⁶ .................................................. G05G 1/14
[52] U.S. Cl. ........................... 74/513; 74/526; 123/400
[58] Field of Search .................... 74/512, 513, 500.5, 74/560–563, 526; 123/396, 400, 342

[56] References Cited

U.S. PATENT DOCUMENTS

| | | | |
|---|---|---|---|
| 1,865,561 | 7/1932 | Furgarson | 123/400 |
| 2,566,859 | 9/1951 | Seeler | 74/513 |
| 2,848,216 | 8/1958 | McGurk | 267/1 |
| 2,924,117 | 2/1960 | Byrd | 74/513 X |
| 3,646,829 | 3/1972 | Reno | 74/513 |
| 3,724,287 | 4/1973 | Dreeben | 74/526 |
| 3,981,207 | 9/1976 | Stant et al. | 74/513 |
| 4,094,281 | 6/1978 | Kittler | 74/526 X |
| 4,480,496 | 11/1984 | Marshall | 74/513 |
| 5,191,866 | 3/1993 | Tosdale | 123/400 |
| 5,339,783 | 8/1994 | Teichert | 123/400 |

FOREIGN PATENT DOCUMENTS

| | | | |
|---|---|---|---|
| 4021321 | 1/1991 | Germany | 74/513 |
| 642853 | 9/1950 | United Kingdom | 74/513 |

*Primary Examiner*—Vinh T. Luong

[57] ABSTRACT

A governor of a vehicle for limiting travel of a vehicle accelerator pedal. The inventive device includes a mounting assembly for clamping to a vehicle accelerator pedal. A limiting assembly extends from the mounting assembly for engaging the floor board of the vehicle to limit the users ability to fully depress the accelerator pedal of a vehicle. An adjustment assembly is coupled to the limiting assembly for permitting the user to adjust the travel distance of the accelerator pedal thus controlling the speed of the motor.

3 Claims, 4 Drawing Sheets

ACCELERATOR PEDAL MECHANICAL GOVERNOR

BACKGROUND OF THE INVENTION

1. Field of the Invention

The present invention relates to vehicle speed control devices and more particularly pertains to an accelerator pedal mechanical governor for limiting travel of a vehicle accelerator pedal.

2. Description of the Prior Art

The use of vehicle speed control devices is known in the prior art. More specifically, vehicle speed control devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle speed control devices include U.S. Pat. No. 4,928,647; U.S. Pat. No. 4,546,667; U.S. Pat. No. 4,527,682; U.S. Pat. No. 4,012,965; and U.S. Pat. No. 3,918,320.

While these devices fulfill their respective, particular objectives and requirements, the aforementioned patents do not disclose an accelerator pedal mechanical governor for limiting travel of a vehicle accelerator pedal which includes a mounting assembly for clamping to a vehicle accelerator pedal, a limiting assembly extending from the mounting assembly for engaging a floor board of the vehicle to limit depression of the pedal, and an adjustment assembly coupled to the limiting assembly for permitting a remote adjustment of a length thereof.

In these respects, the accelerator pedal mechanical governor according to the present invention substantially departs from the conventional concepts and designs of the prior art, and in so doing provides an apparatus primarily developed for the purpose of limiting travel of a vehicle accelerator pedal.

SUMMARY OF THE INVENTION

In view of the foregoing disadvantages inherent in the known types of vehicle speed control devices now present in the prior art, the present invention provides a new accelerator pedal mechanical governor construction wherein the same can be utilized for limiting travel of a vehicle accelerator pedal to limit a speed of the vehicle. As such, the general purpose of the present invention, which will be described subsequently in greater detail, is to provide a new accelerator pedal mechanical governor apparatus and method which has many of the advantages of the vehicle speed control devices mentioned heretofore and many novel features that result in an accelerator pedal mechanical governor which is not anticipated, rendered obvious, suggested, or even implied by any of the prior art vehicle speed control devices, either alone or in any combination thereof.

To attain this, the present invention generally comprises a governor for limiting travel of a vehicle accelerator pedal. The inventive device includes a mounting assembly for clamping to a vehicle accelerator pedal. A limiting assembly extends from the mounting assembly for engaging a floor board of the vehicle to limit depression of the pedal. An adjustment assembly is coupled to the limiting assembly for permitting a remote adjustment of the limiting assembly to a desired length.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new accelerator pedal mechanical governor apparatus and method which has many of the advantages of the vehicle speed control devices mentioned heretofore and many novel features that result in an accelerator pedal mechanical governor which is not anticipated, rendered obvious, suggested, or even implied by any of the prior art vehicle speed control devices, either alone or in any combination thereof.

It is another object of the present invention to provide a new accelerator pedal mechanical governor which may be easily and efficiently manufactured and marketed.

It is a further object of the present invention to provide a new accelerator pedal mechanical governor which is of a durable and reliable construction.

An even further object of the present invention is to provide a new accelerator pedal mechanical governor which is susceptible of a low cost of manufacture with regard to both materials and labor, and which accordingly is then susceptible of low prices of sale to the consuming public, thereby making such accelerator pedal mechanical governors economically available to the buying public.

Still yet another object of the present invention is to provide a new accelerator pedal mechanical governor which provides in the apparatuses and methods of the prior art some of the advantages thereof, while simultaneously overcoming some of the disadvantages normally-associated therewith.

Still another object of the present invention is to provide a new accelerator pedal mechanical governor for limiting travel of a vehicle accelerator pedal to ensure that a vehicle does not exceed a desired maximum speed.

Yet another object of the present invention is to provide a new accelerator pedal mechanical governor which includes a mounting assembly for clamping to a vehicle accelerator pedal, a limiting assembly extending from the mounting assembly for engaging a floor board of the vehicle to limit depression of the pedal, and an adjustment assembly coupled to the limiting assembly for permitting a remote adjustment of a length thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
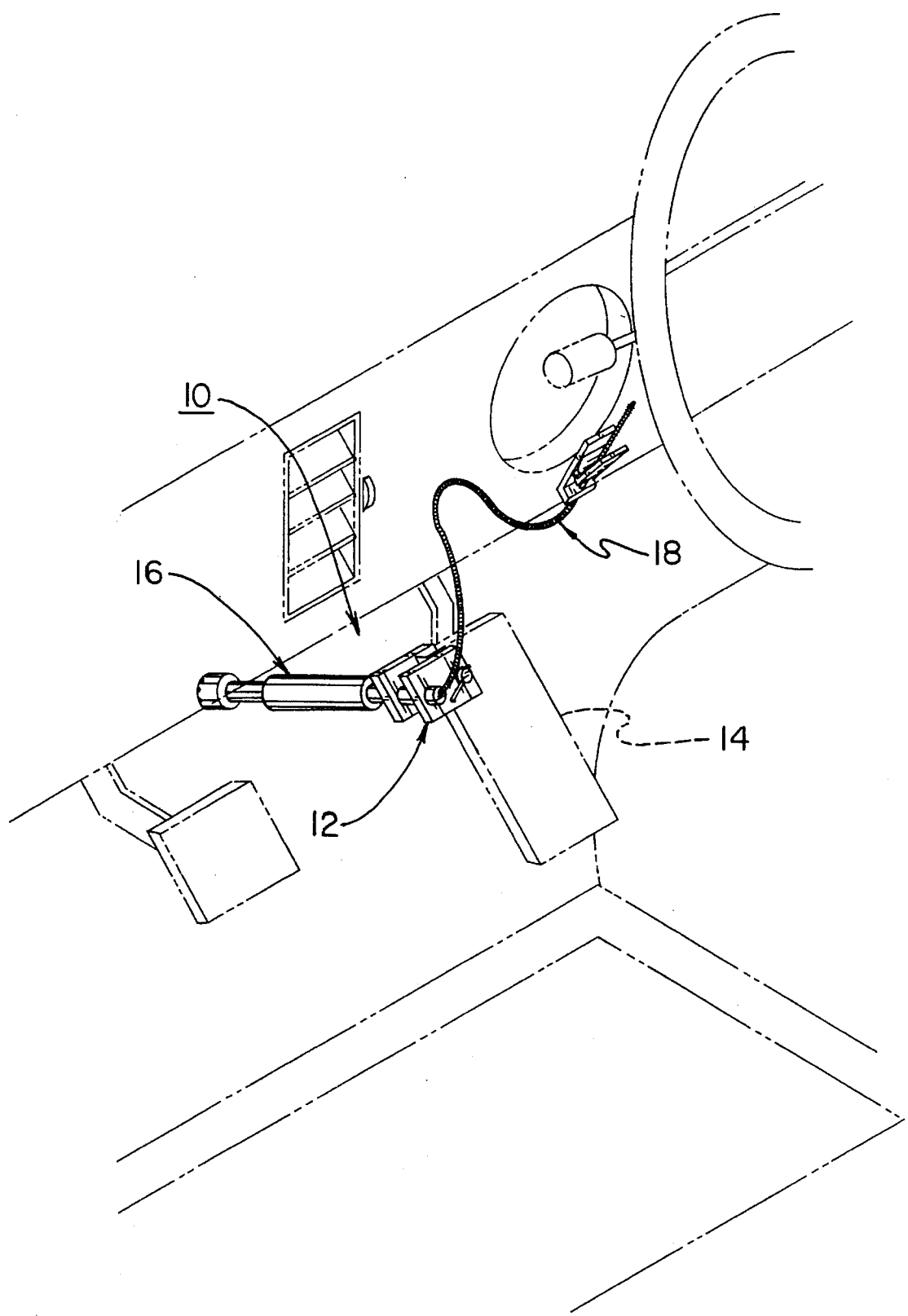
FIG. 1 is an isometric illustration of an accelerator pedal mechanical governor according to the present invention in use.

With reference now to the drawings, and in particular to FIGS. 1–7 thereof, a new accelerator pedal mechanical governor embodying the principles and concepts of the present invention and generally designated by the reference numeral 10 will be described.

More specifically, it will be noted that the accelerator pedal mechanical governor 10 comprises a mounting means 12 for securing to an accelerator pedal 14 of an unlabelled vehicle. A limiting means 16 extends from the mounting means 12 and is positioned for engagement with a floor board 11 of the vehicle to limit depression of the accelerator pedal 14. An adjustment means 18 is coupled to the limiting means 16 for selectively adjusting a length of the limiting means so as to limit a depression of the accelerator pedal 14 to a desired maximum position.

Figure 5:
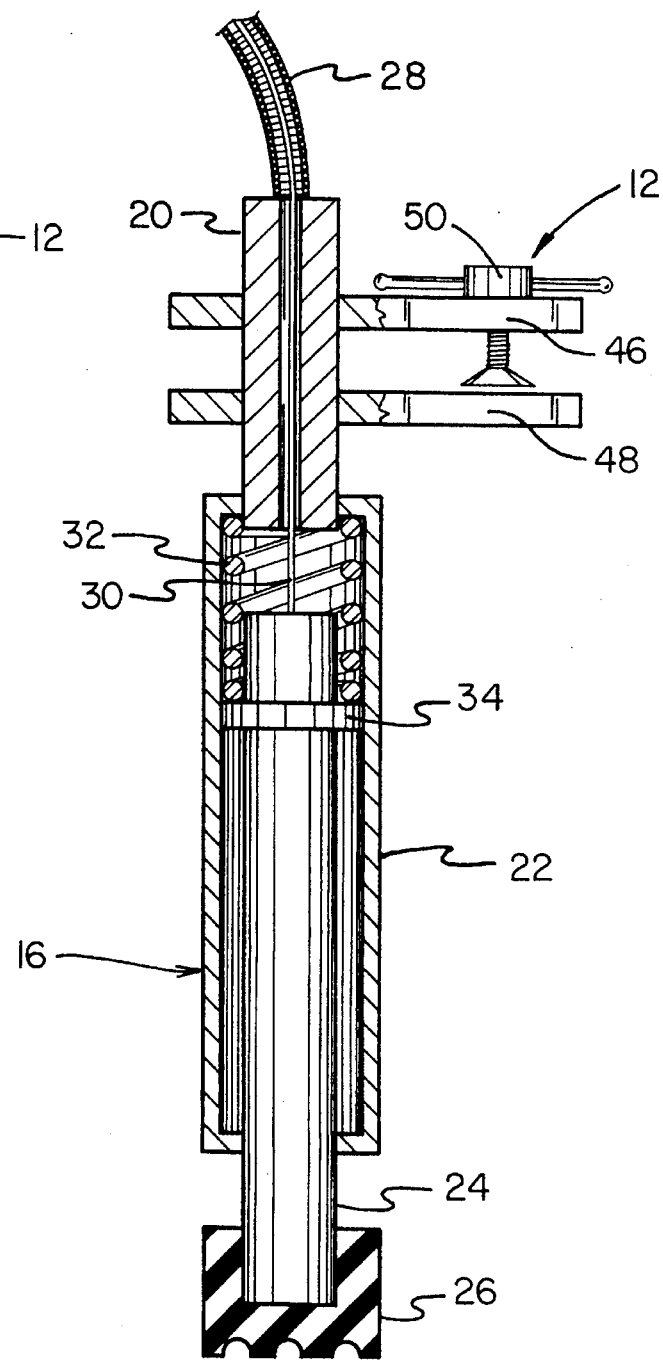
FIG. 5 is a cross-sectional view taken along line 5—5 of FIG. 4.

As best illustrated in FIG. 5, it can be shown that the limiting means 16 according to the present invention 10 comprises a mounting boss 20 coupled to the mounting means 12. A cylindrical receiver 22 is coupled to the mounting boss 20 and oriented so as to extend colinearly relative thereto. An extension rod 24 is received within the cylindrical receiver 22 and projects at least partially exteriorly thereof to terminate in an eiastomeric foot 26. The extension rod 24 can thus be extended to a desired length from the cylindrical receiver 22 to limit travelling of the vehicle accelerator pedal 14 to a desired maximum position.

Figures 2, 3:
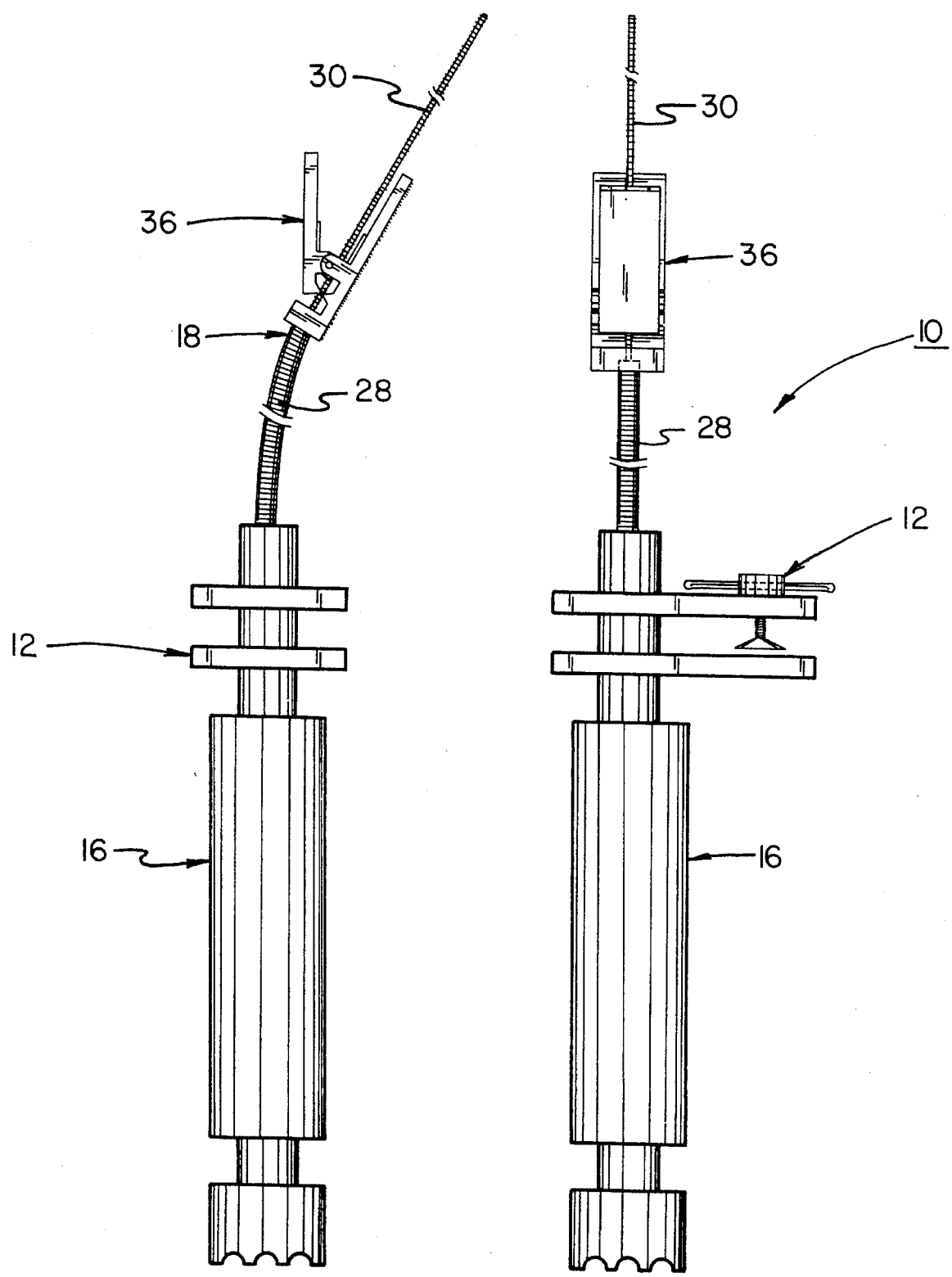
FIG. 2 is a side elevation view of the invention.
FIG. 3 is a front elevation view thereof.
Figure 4:
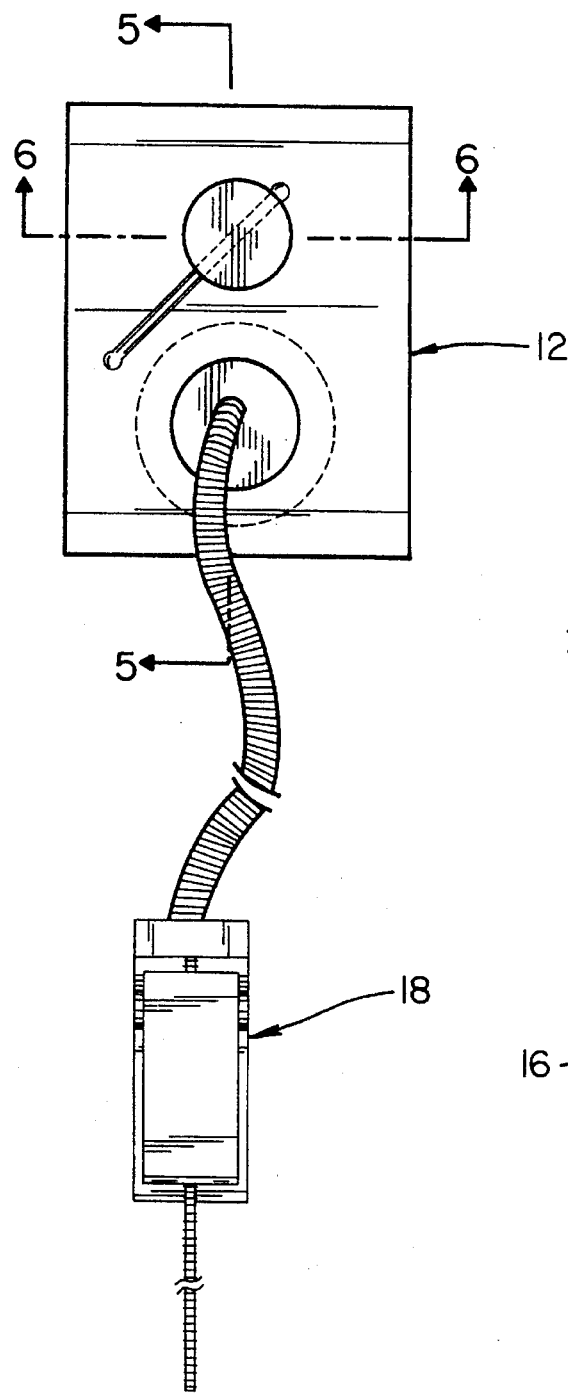
FIG. 4 is a top plan view of the invention.

With continuing reference to FIG. 5 and concurrent reference to FIGS. 2 and 3, it can be shown that the adjustment means 18 according to the present invention 10 comprises a cable sheath 28 mounted to an upper end 29 of the mounting boss 20 through which a cable 30 extends. The mounting boss 20 includes a through-extending aperture 21 permitting extension of the cable 30 into the cylindrical receiver 22 wherein the cable is coupled to the extension rod 24 within the cylindrical receiver 22. A spring 32 is interposed between an upper end of the cylindrical receiver 22 and an abutment plate 34 secured to the extension rod 24. By this structure, the cable can be retracted from the cylindrical receiver 22 through the cable sheath 28 to position the extension rod 24 at a desired length projecting from the cylindrical receiver 22. The spring 32 should be of sufficient strength to preclude unintentional depression of the accelerator pedal 14 past a desired position. However, in an emergency situation where full use of the pedal 14 is needed, a greater force can be imposed on the pedal to permit such movement of the pedal.

Figure 7:
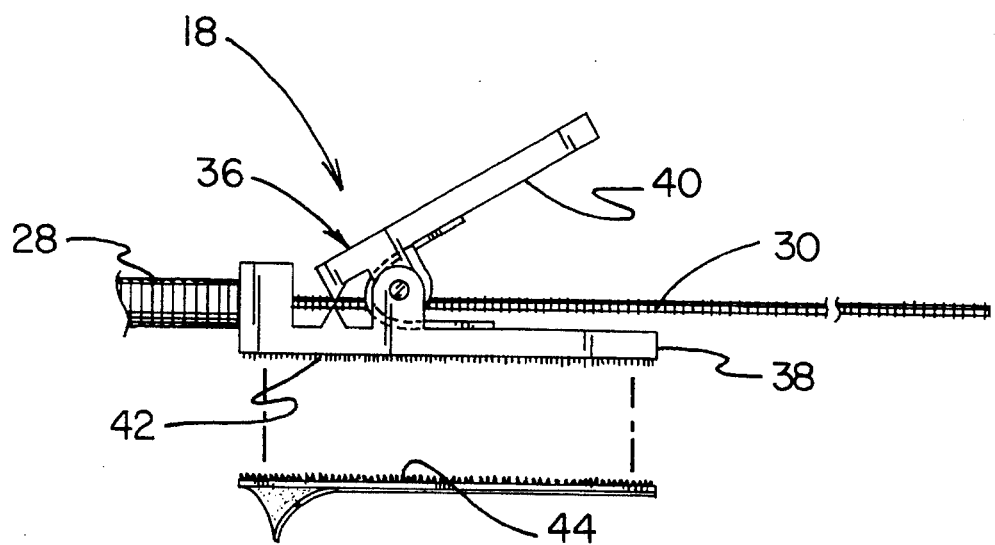
FIG. 7 is a side elevation view of a portion of the adjustment means.

As shown in FIGS. 2 and 3, the adjustment means 18 further comprises a clamp 36 coupled to the cable sheath for securing a position of the cable 30 relative thereto. As shown in FIG. 7, the clamp 36 of the adjustment means 18 preferably comprises a base plate 38 having a clamp plate 40 pivotally mounted thereto. A biasing spring 39 biases the clamp plate 40 towards the base plate 38 so as to capture the cable 30 between the clamp plate 40 and the base plate 38. The cable sheath 28 is fixedly secured to the base plate 38 such that a clamping of the cable 30 between the clamp plate 40 and the base plate will retain the cable 30, and the extension rod 24 attached thereto, in a desired position. To facilitate mounting of the clamp 36 to a dashboard or other portion of the associated vehicle, the base plate 38 can be provided with a first portion 42 of a hook and loop fastening material, with a second portion 44 of hook and loop fastening material being securable to the portion of the vehicle in a desired location. By this structure, the extension rod 24 of the limiting means 16 can be selectively adjusted to a desired length to limit a maximum depression of the accelerator pedal 14 and hence, a maximum speed of the associated vehicle.

Figure 6:
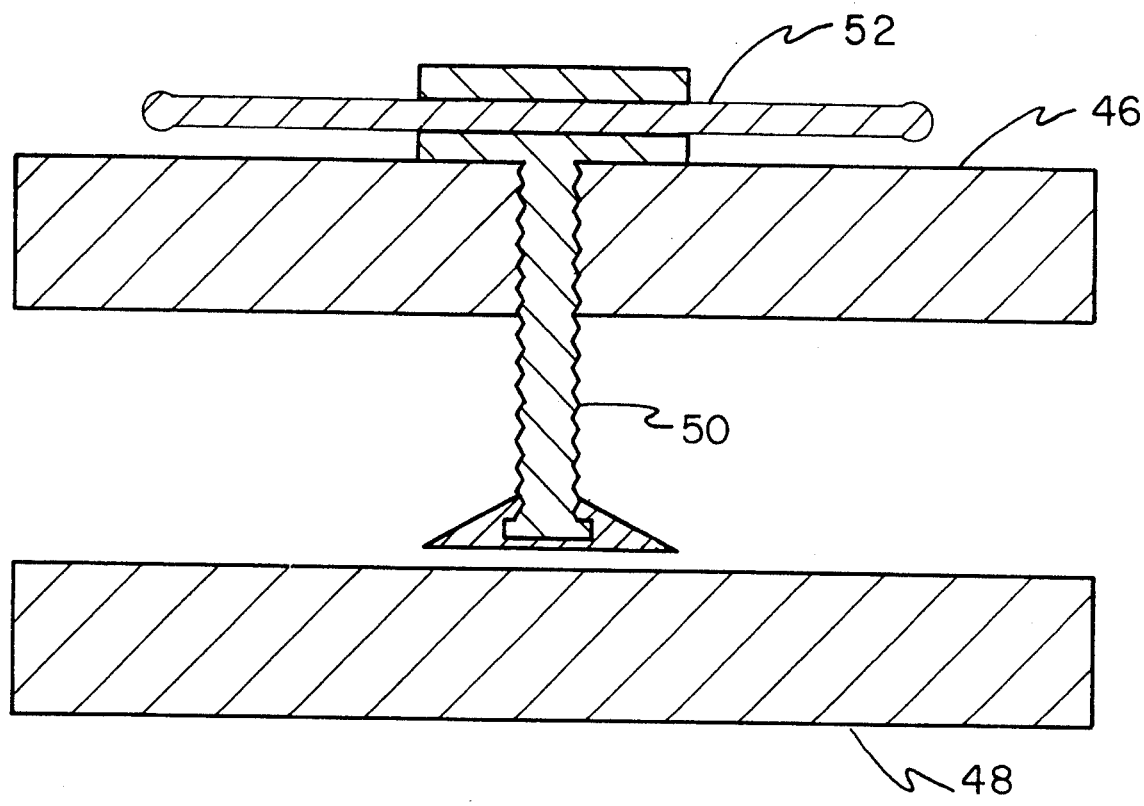
FIG. 6 is a further cross-sectional view taken along line 6—6 of FIG. 4.

As best illustrated in FIGS. 5 and 6, it can be shown that the mounting means 12 according to the present invention 10 comprises a first mounting plate 46 fixedly secured to and extending substantially orthogonally from the mounting boss 20 of the limiting means 16. Similarly, a second mounting plate 48 is fixedly secured to and extends substantially orthogonally from the mounting boss 20 into a spaced and substantially parallel orientation relative to the first mounting plate 46. A mounting fastener 50 is threadably directed through the first mounting plate 46 and arranged for abutting engagement with the second mounting plate 48 so as to capture a portion of the vehicle pedal 14 between the mounting fastener 50 and an interior surface of the second mounting plate 48. By this structure, the mounting means 12 can be easily coupled to a portion of the accelerator pedal 14 of the vehicle in a desired location. As shown in FIG. 6, the mounting fastener 50 may include a slidably mounted handle 52 permitting varying amounts of leverage to be applied to the mounting fastener during rotation thereof to effect tightening of the mounting means 12 to the accelerator pedal 14.

In use, the accelerator pedal mechanical governor 10 according to the present invention can be easily coupled to the accelerator pedal 14 of an associated vehicle. The adjustment means 18 can also be selectively coupled to a desired portion of the vehicle in a location remote from the mounting means 12 but easily accessible by a driver of the vehicle. The cable 30 off the adjustment means 18 can then be selectively extended or retracted relative to the cable sheath 28 so as to retract or extend the extension rod 24 relative to the cylindrical receiver 22 to limit a maximum depressed position of the accelerator pedal 14. The device 10 operates to limit a speed of the vehicle to preclude a driver from exceeding a particular speed limit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An accelerator pedal mechanical governor comprising:

a mounting means for securing to an accelerator pedal of a vehicle;

a limiting means extending from the mounting means and positioned for engagement with a floor board of the vehicle to limit depression of the accelerator pedal; and, an adjustment means coupled to the limiting means for selectively adjusting a length of the limiting means so as to limit a depression of the accelerator pedal to a maximum position, wherein the limiting means comprises a mounting boss coupled to the mounting means; a cylindrical receiver coupled to the mounting boss and oriented so as to extend colinearly relative thereto; an extension rod received within the cylindrical receiver and projecting at least partially exteriorly thereof, wherein the extension rod extends to a predetermined length from the cylindrical receiver to limit traveling of the vehicle accelerator, wherein the adjustment means comprises a cable sheath mounted to an upper end of the mounting boss; a cable extending through the cable sheath, the mounting boss including a through-extending aperture permitting extension of the cable into the cylindrical receiver wherein the cable is coupled to the extension rod within the cylindrical receiver; and a spring interposed between an upper end of the cylindrical receiver and a portion of the extension rod, wherein the cable can be retracted from the cylindrical receiver through the cable sheath to position the extension rod relative to the cylindrical receiver, wherein the adjustment means further comprises a clamp coupled to the cable sheath for securing a position of the cable relative thereto, wherein the clamp of the adjustment means comprises a base plate; a clamp plate pivotally mounted to the base plate; a biasing spring biasing the clamp plate towards the base plate so as to capture the cable between the clamp plate and the base plate, the cable sheath being fixedly secured to the base plate such that a clamping of the cable between the clamp plate and the base plate retains the cable relative to the cable sheath.

2. The accelerator pedal mechanical governor of claim 1, wherein the base plate is provided with a first portion of a hook and loop fastening material secured thereto, with a second portion of hook and loop fastening material being coupled to the first portion and secured to the floor board of a vehicle.

3. The accelerator pedal mechanical governor of claim 2, wherein the mounting means comprises a first mounting plate fixedly secured to and extending substantially orthogonally from the mounting boss of the limiting means; a second mounting plate fixedly secured to and extending substantially orthogonally from the mounting boss into a spaced and substantially parallel orientation relative to the first mounting plate; a mounting fastener threadably directed through the first mounting plate and arranged for abutting engagement with the second mounting plate so as to capture a portion of the accelerator pedal between the mounting fastener and an interior surface of the second mounting plate.

* * * * *